United States Patent
Parikh et al.

(10) Patent No.: US 10,244,052 B2
(45) Date of Patent: Mar. 26, 2019

(54) TIERED INFRASTRUCTURE FOR HANDLING DATA

(71) Applicant: Facebook, Inc., Menlo Park, CA (US)

(72) Inventors: Jay Parikh, San Ramon, CA (US); Hongzhong Jia, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 170 days.

(21) Appl. No.: 15/360,436

(22) Filed: Nov. 23, 2016

(65) Prior Publication Data

US 2018/0146032 A1 May 24, 2018

(51) Int. Cl.
*H04L 29/08* (2006.01)
*G06Q 50/00* (2012.01)

(52) U.S. Cl.
CPC ......... *H04L 67/1097* (2013.01); *G06Q 50/01* (2013.01); *H04L 67/2823* (2013.01)

(58) Field of Classification Search
CPC ... H04L 67/1014; H04L 67/02; H04L 67/306; H04L 61/2007; H04L 67/1097
See application file for complete search history.

(56) References Cited

U.S. PATENT DOCUMENTS

| | | | |
|---|---|---|---|
| 8,972,570 B1 | 3/2015 | Narasimhan et al. | |
| 2013/0091207 A1* | 4/2013 | Diab | H04W 4/21 709/204 |
| 2013/0110890 A1* | 5/2013 | Bailor | H04L 51/22 707/827 |
| 2013/0268629 A1 | 10/2013 | Fieau et al. | |
| 2016/0028846 A1 | 1/2016 | Coglitore et al. | |
| 2016/0119420 A1* | 4/2016 | Abuelsaad | G06F 17/30575 709/219 |
| 2016/0132613 A1 | 5/2016 | Obbard et al. | |
| 2016/0316014 A1 | 10/2016 | Li et al. | |

FOREIGN PATENT DOCUMENTS

| | | |
|---|---|---|
| EP | 2587761 A2 | 5/2013 |
| KR | 1020100058786 A | 6/2010 |
| KR | 1020140083289 A | 7/2014 |

OTHER PUBLICATIONS

International Search Report and Written Opinion in International Application No. PCT/US2017/015145, dated Jun. 21, 2017, 12 pages.
Extended European Search Report dated Aug. 1, 2017 for European Patent Application No. 17155192.2 filed for Facebook Inc.
U.S. Appl. No. 15/835,334 by Jia, H., filed Dec. 7, 2017.

* cited by examiner

*Primary Examiner* — Arvin Eskandarnia
*Assistant Examiner* — Justin C Turriate Gastulo
(74) *Attorney, Agent, or Firm* — FisherBroyles, LLP

(57) ABSTRACT

The disclosure is directed to receiving a digitized content item that is indicated to be shared with users (e.g., all, some, or one) of a social networking system; selecting, based on one or more characteristics of the digitized content item, a second server computing device at which to further compute or store the digitized content item; and transmitting, to the second computing device, the digitized content item for storage at the second computing device. At least one of the characteristics can be a classification of a user who transmitted the digitized content item via the data communications network. By selecting second server computing devices based on characteristics, data communications network performance can be improved.

18 Claims, 4 Drawing Sheets

TIERED INFRASTRUCTURE FOR HANDLING DATA

BACKGROUND

Social networking systems enable a very large number of users (e.g., a billion users or more) to share data worldwide. To support this data sharing, the social networking systems have multiple data centers that are distributed around the world. The multiple data centers enable the data to be distributed worldwide, e.g., to back up data or to store data near where the data will be consumed. Each of these data centers typically has a very large number of server computing devices. The server computing devices may be assigned various roles, e.g., compute, data storage, web site, etc.

Various specialized roles of server computing devices may be centrally located. As an example, server computing devices that transcode content from one content type to another (e.g., video in one format to video in a different format) may be centrally located.

Data centers may be built based on various requirements and constraints. Data centers in developed countries can be large, where power and land are available. In countries where power and land are less available or there is a regulation concern, data centers may be smaller. Because larger data centers are easier to manage and provide superior scalability, they are preferred and tend to be built in a handful of locations. On the other hand, for flexibility and nimbleness, small data centers are preferred and they are built in many places wherever there are users of the social networking system. As a result, the infrastructure for a social networking systems may have various sizes of data centers that are geographically dispersed.

In typical data center environments, data is stored wherever there is capacity. However, social networks have specific characteristics of usage. As an example, content generated by some users (e.g., celebrity users) may be more widely consumed than content generated by other users (e.g., common users). When a server computing device is selected for storing the generated content merely based on where there is capacity, consumers of data who are not located proximate to where the data is stored may experience various network delays before they can view or otherwise consume the stored data. These delays can occur, e.g., because of network bandwidth and latency issues between data centers or between the data center storing the data and the user who is requesting to consume (e.g., view or otherwise cause to be rendered) the stored data. Even if network bandwidth can be improved between data centers or users, such improvements can be expensive. Thus, determining where to locate data storage and computation resources can be useful.

DETAILED DESCRIPTION

Figure 1:
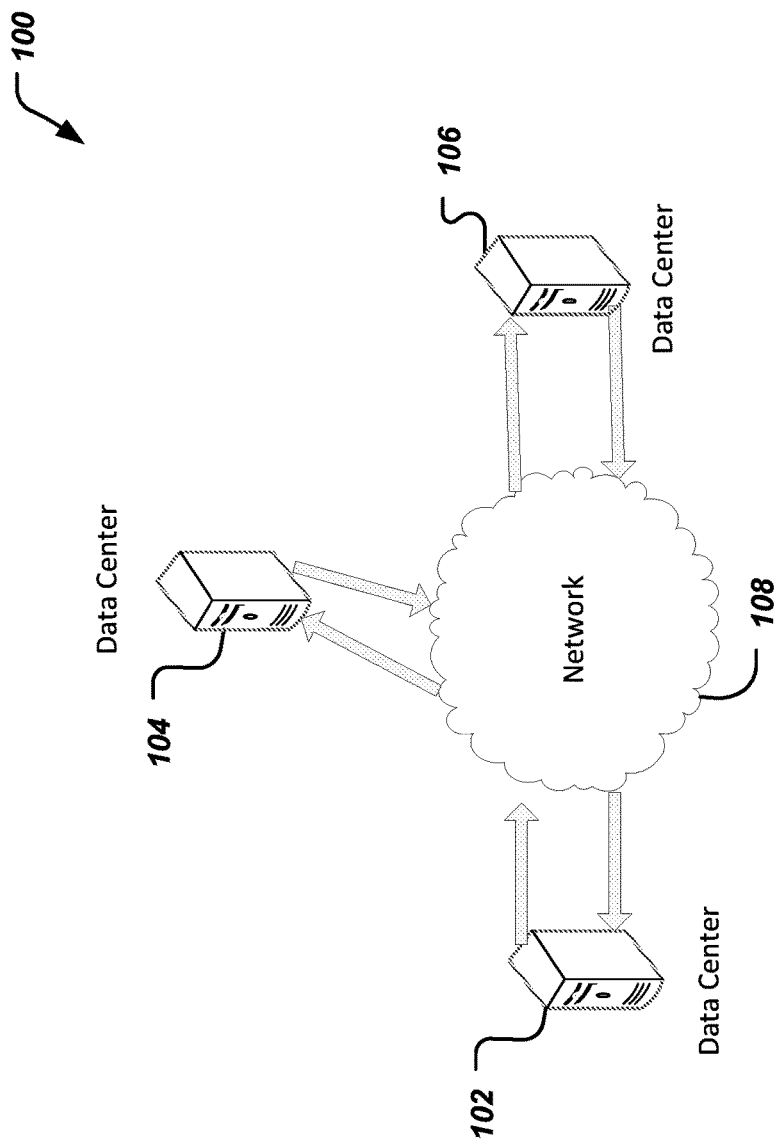
FIG. 1 is a block diagram illustrating an environment in which a tiered data storage architecture can be implemented, consistent with various embodiments.

The disclosure is directed to a tiered infrastructure for handling data based on consumption characteristics. In various embodiments, a first server computing device of a social networking system receives, via a data communications network, a digitized content item that is indicated to be shared with users (e.g., all or a subset of users) of the social networking system. A server selection engine can then select, based on one or more characteristics of the digitized content item, a second server computing device at which to further compute and/or store the digitized content item. At least one of the characteristics can be a classification of a user who transmitted the digitized content item via the data communications network. The further computation can be, for example, to transcode video files from one format to a different format. The selection engine can then transmit, to the second computing device, the digitized content item for further computation and/or storage at the second computing device. In some embodiments, the content item can be large content that occupies a lot of networking bandwidth when it is transmitted, e.g., video.

The selection engine can select the second server computing device based on a classification of the user from whom the content item was received. As an example, if the content item was received from a celebrity, the selection engine can select a second server computing device that is at a higher tier than if the user is classified as a general user. By selecting a higher tier, the content item is made more widely available directly, e.g., to multiple downstream server computing devices (e.g., nodes in a hierarchy). In various embodiments, the selection engine can operate at near real time, e.g., contemporaneously with receiving the content items.

In some embodiments, the selection engine may first transmit the content item to a third server so that the third server can transcode the received content item the content item is stored at the second server computing device.

In some embodiments, the selection engine may select a classification as a function of a number of friend connections the user who uploaded the content item has in a social graph. As an example, the more the users, the higher the selected tier for the second server computing device. As a further refinement, the tier can be selected based on the geographic proximity of the user's friends in the social network. In other words, the social networking system assumes that the content item will be consumed by friends of the user. In some embodiments, the selection engine evaluates the Internet Protocol (IP) address of the computing device from which the digitized content item was received to select a nearby second server computing device at which the content item should be stored.

Thus, the server computing devices and the data centers may belong to one or more tiers, wherein the tiers may be distributed based on geography or function. The selection engine can select an appropriate tier to minimize (or otherwise optimize) the bandwidth consumption that would be caused when the content item is consumed, e.g., by friends indicated in the social networking system for the user who uploaded the content item.

The selection engine can select where to allocate computing or storage resources based on various rules. For example, for a live video streaming application, if the data uploaded by a celebrity and there are typically a large number of viewers around the world, leveraging compute/storage resources in a large data center may be preferred because there may be more resources available there and the data will be viewed around the world to be viewed by users worldwide. If the video is from a general user with most friends located in a local region, then a nearby data center would be preferred because the video will typically be viewed by local users.

In various embodiments, the rules the selection engine evaluates and responds to may be dynamically updated. For example, a general user's data (e.g. video stream) may become viral (meaning that it is being viewed by increasing numbers of users) and so it is then preferred to be computed or stored in a larger datacenter instead of a nearby datacenter.

In various embodiments, for a particular content item (e.g., video stream), the selection engine can select one data center for transcoding or otherwise processing it (e.g., assigning compute resources) and a different data center for storing it. As an example, the selection engine may select a data center that presently has more compute resources available for quickly processing the content item, and then a different data center to store it closer to users who will likely view the content item. As another example, the selection engine may select multiple data centers if redundancy is needed (e.g., for content items that are important or will be viewed by many users worldwide).

The objectives for the selection engine can be different, e.g., at different times or in different scenarios. As examples, to optimize for cost a more economical data center may be initially assigned; to reduce data communications latency, the closest data center may be assigned first; to balance network load, multiple data centers that are geographically dispersed may initially be assigned. One skilled in the art will recognize that other modifications may be made.

Environment

Turning now to the figures, FIG. 1 is a block diagram illustrating an environment 100 in which tiered data storage architecture can be implemented. The tiered architecture may be used to store data across various storage layers, e.g., to increase the efficiency of data storage. One or more data centers 102, 104, and 106 may be interconnected via a network 108 (e.g., the Internet). The data centers may be tiered. Alternatively, servers within the data centers (not illustrated) may be tiered. Tiering can be performed at a geographic or functional level. The higher the tier for a computing device, the more downstream devices in the network the computing device directly communicates with. In various embodiments, data centers 102, 104, and 106 can have different "sizes," meaning number and types of server computing devices, networking resources, etc.

Figure 2:
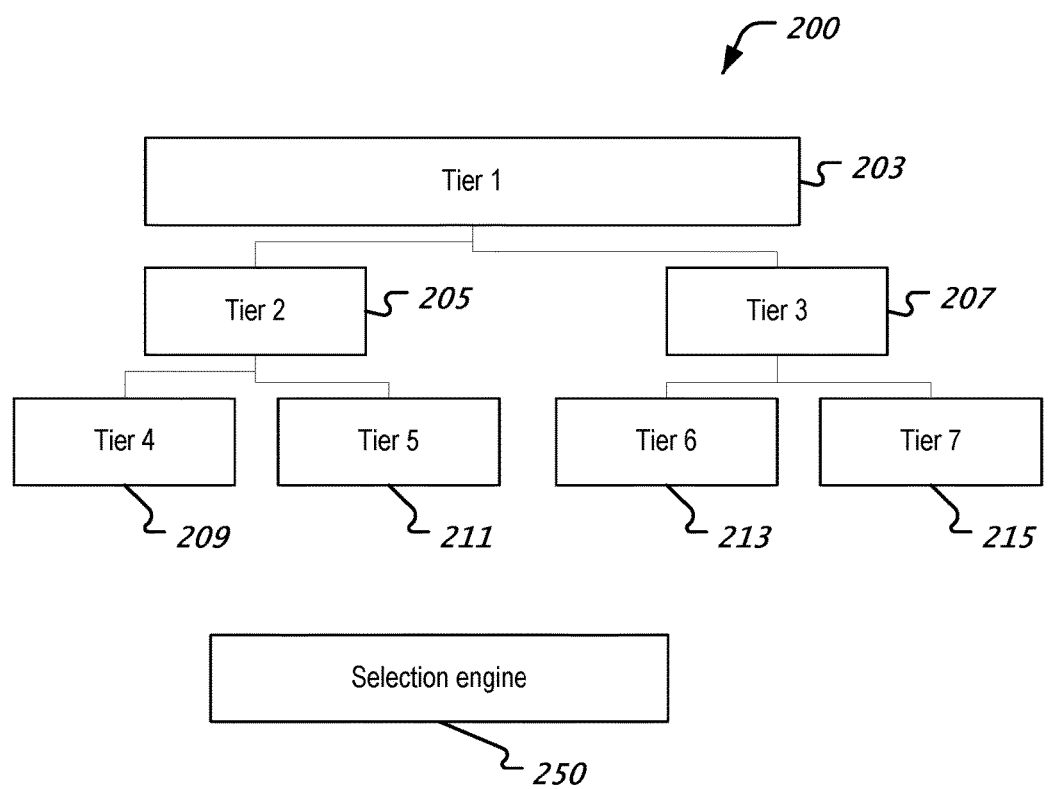
FIG. 2 is a block diagram of an example implementation of tiers, consistent with various embodiments.

FIG. 2 is a block diagram of an example implementation of tiers, consistent with various embodiments. The implementation 200 includes a top-level tier 203 that services tiers 205 and 207. Tier 205 services tiers 209 and 211, and tier 207 services tiers 213 and 215. The lowest-level tiers 209, 211, 213, and 215 may each service users or other tiers. Because of this tiered relationship, data is stored or provided by a higher tier, it is available to more users than when it stored at a lower tier. However, additional network hops may be required to consume data stored at higher tiers. In contrast, when data is not stored in the direct path between the user and the top-level tier, the data may have to transit even more tiers. As an example, when a user associated with tier 209 requests data that is stored at tier 207, the data may need to transit tiers 203 and 205 before arriving at tier 209. In contrast, if that data was to be stored at tier 205, it would only have to transit tier 209 before arriving at the user's computing device.

The illustrated implementation 200 also includes one or more selection engines 250. The selection engines can select a tier (or server computing device within a tier) at which uploaded data items should be stored. The selection engine can receive, store, and evaluate various "rules." These rules can evaluate various characteristics, e.g., location of users, type of content, number of friend connections for the user who is uploading the content item, etc. The evaluation can indicate which tier or server computing device the content item should be stored at. By selecting an appropriate server computing device or tier, the selection engine attempts to reduce the amount of network bandwidth and hops required to service requests for content items.

Figure 3:
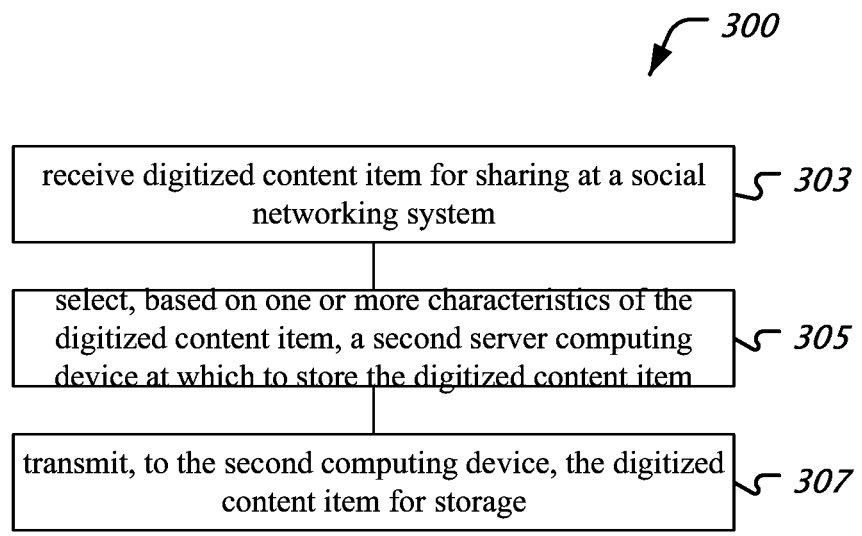
FIG. 3 is a flow diagram illustrating processing of content items that are uploaded to the system illustrated in FIG. 1, consistent with various embodiments.

FIG. 3 is a flow diagram illustrating processing of content items that are uploaded to the system illustrated in FIG. 1, consistent with various embodiments. At block 303 of the illustrated routine 300, when a content item is uploaded by a user, it is received and processed. At block 305, e.g., as may be performed by a selection engine, a server computing device and/or a tier is selected for storage of the content item. The selection can be based on various characteristics, e.g., pertaining to the content item or the user who uploaded it. As an example, based on the IP address of the user who uploaded the content item, the number of friends the user has, or the celebrity status of the user, the content item may be stored at various tier levels. At block 307, the content item is transmitted to the selected server computing device or tier for storage.

Figure 4:
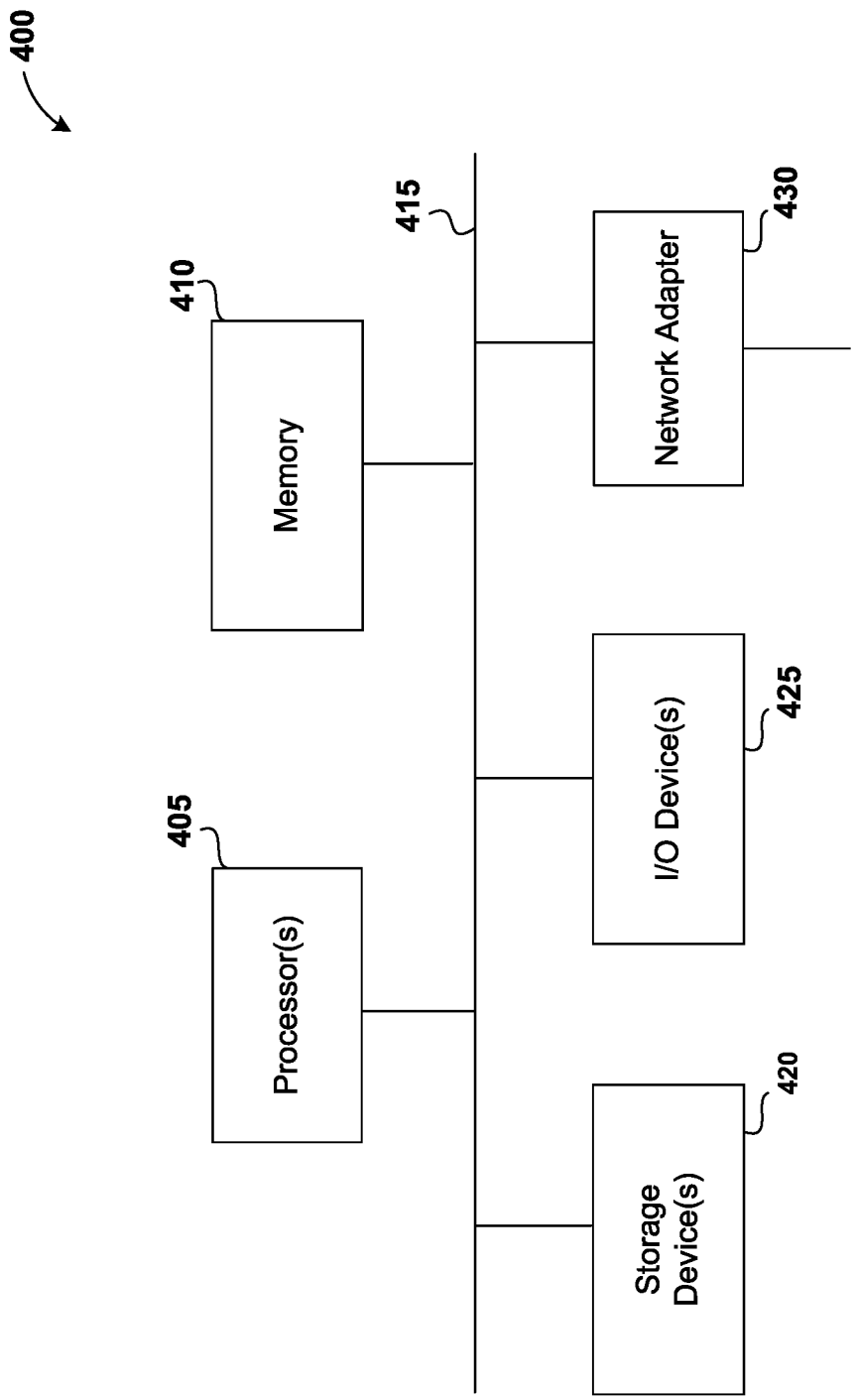
FIG. 4 is a block diagram of a server of FIG. 1, consistent with various embodiments.

FIG. 4 is a block diagram of a server of FIG. 1, consistent with various embodiments. The computing system 400 may be used to implement any of the entities, components or services depicted in the examples of FIGS. 1-7 (and any other components described in this specification). The computing system 400 may include one or more central processing units ("processors") 405, memory 410, input/output devices 425 (e.g., keyboard and pointing devices, display devices), storage devices 420 (e.g., disk drives), and network adapters 430 (e.g., network interfaces) that are connected to an interconnect 415. The interconnect 415 is illustrated as an abstraction that represents any one or more separate physical buses, point to point connections, or both connected by appropriate bridges, adapters, or controllers. The interconnect 415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 410 and storage devices 420 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 410 can be implemented as software and/or firmware to program the processor(s) 405 to carry out actions described above. In some embodiments, such software or firmware may be initially provided to the processing system 400 by downloading it from a remote system through the computing system 400 (e.g., via network adapter 430).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by at least one computing device, comprising:
    receiving, via a data communications network at a social network system, a digitized content item that is indicated to be shared with users of the social network system, wherein:
        the social network system comprises:
            at least one higher-tier computing device storing first content items;
            a first bottom-tier computing device storing second content items; and
            a second bottom-tier computing device storing third content items;
        the at least one higher-tier computing device is configured to service content-item requests from lower-tier computing devices of the social network system;
        the first bottom-tier computing device is configured to:
            service content-item requests from a first user that accesses the social network system via the first-bottom-tier computing device; and
            access the first content items and the third content items via the at least one higher-tier computing device when servicing requests for the first content items and the third content items; and
        the second bottom-tier computing device is configured to:
            service content-item requests from a second user that accesses the social network system via the second bottom-tier computing device; and
            access the first content items and the second content items via the at least one higher-tier computing device when servicing requests for the first content items and the second content items;
    reducing at least one of an amount of network bandwidth or a number of network hops required within the social network system to service requests for the digitized content item by selecting, based on one or more characteristics of the digitized content item, one of the at least one higher-tier computing device, the first bottom-tier computing device, or the second bottom-tier computing device at which to further compute or store the digitized content item, wherein at least one of the characteristics is a classification of a third user who transmitted the digitized content item via the data communications network; and
    transmitting, to the selected one of the at least one higher-tier computing device, the first bottom-tier computing device, or the second bottom-tier computing device, the digitized content item for storage at the selected one of the at least one higher-tier computing device, the first bottom-tier computing device, or the second bottom-tier computing device.

2. The method of claim 1, wherein in an event the third user's digitized content items are viewed worldwide, the selecting comprises selecting the at least one higher-tier computing device at a higher tier than if the third user's digitized content items are viewed in a local region.

3. The method of claim 1, wherein the selecting is performed contemporaneously with the receiving.

4. The method of claim 1, further comprising transcoding, at a different computing device proximate to the selected one of the at least one higher-tier computing device, the first bottom-tier computing device, or the second bottom-tier computing device, the digitized content item prior to storage of the digitized content item.

5. The method of claim 1, wherein the classification is a function of a number of friend connections the third user has in a social graph.

6. The method of claim 1, wherein the selecting further includes evaluating the internet protocol address of the computing device from which the digitized content item was received.

7. A non-transitory computer-readable storage device storing instructions, the instructions comprising:
    instructions for receiving, via a data communications network at a social network system, a digitized content item that is indicated to be shared with users of the social network system, wherein:
        the social network system comprises:
            at least one higher-tier computing device storing first content items;
            a first bottom-tier computing device storing second content items; and
            a second bottom-tier computing device storing third content items;
        the at least one higher-tier computing device is configured to service content-item requests from lower-tier computing devices of the social network system;
        the first bottom-tier computing device is configured to:
            service content-item requests from a first user that accesses the social network system via the first-bottom-tier computing device; and
            access the first content items and the third content items via the at least one higher-tier computing device when servicing requests for the first content items and the third content items; and
        the second bottom-tier computing device is configured to:
            service content-item requests from a second user that accesses the social network system via the second bottom-tier computing device; and
            access the first content items and the second content items via the at least one higher-tier computing device when servicing requests for the first content items and the second content items;
    instructions for reducing at least one of an amount of network bandwidth or a number of network hops required within the social network system to service requests for the digitized content item by selecting, based on one or more characteristics of the digitized content item, one of the at least one higher-tier computing device, the first bottom-tier computing device, or the second bottom-tier computing device at which to further compute or store the digitized content item, wherein at least one of the characteristics is a classification of a third user who transmitted the digitized content item via the data communications network; and
    instructions for transmitting, to the selected one of the at least one higher-tier computing device, the first bottom-tier computing device, or the second bottom-tier computing device, the digitized content item for storage at the selected one of the at least one higher-tier computing device, the first bottom-tier computing device, or the second bottom-tier computing device.

8. The non-transitory computer-readable storage device of claim 7, wherein in an event the third user's digitized content items are viewed worldwide, the selecting comprises selecting the at least one higher-tier computing device at a higher tier than if the third user's digitized content items are viewed in a local region.

9. The non-transitory computer-readable storage device of claim 7, wherein the selecting is performed contemporaneously with the receiving.

10. The non-transitory computer-readable storage device of claim 7, further comprising instructions for transcoding, at a different computing device proximate to the selected one of the at least one higher-tier computing device, the first bottom-tier computing device, or the second bottom-tier computing device, the digitized content item prior to storage of the digitized content item.

11. The non-transitory computer-readable storage device of claim 7, wherein the classification is a function of a number of friend connections the third user has in a social graph.

12. The non-transitory computer-readable storage device of claim 7, wherein the instructions for selecting further comprises instructions for evaluating the internet protocol address of the computing device from which the digitized content item was received.

13. A system, comprising:
    at least one higher-tier computing device storing first content items;
    a first bottom-tier computing device storing second content items;
    a second bottom-tier computing device storing third content items, wherein:
        the at least one higher-tier computing device is configured to service content-item requests from lower-tier computing devices of the social network system;
        the first bottom-tier computing device is configured to:
            service content-item requests from a first user that accesses the social network system via the first-bottom-tier computing device; and
            access the first content items and the third content items via the at least one higher-tier computing device when servicing requests for the first content items and the third content items; and
        the second bottom-tier computing device is configured to:
            service content-item requests from a second user that accesses the social network system via the second bottom-tier computing device; and
            access the first content items and the second content items via the at least one higher-tier computing device when servicing requests for the first content items and the second content items;
    a component configured to receive, via a data communications network, a digitized content item that is indicated to be shared with users of the system;
    a component configured to reduce at least one of an amount of network bandwidth or a number of network hops required within the system to service requests for the digitized content item by selecting, based on one or more characteristics of the digitized content item, one of the at least one higher-tier computing device, the first bottom-tier computing device, or the second bottom-tier computing device at which to further compute or store the digitized content item, wherein at least one of the characteristics is a classification of a third user who transmitted the digitized content item via the data communications network; and
    a component configured to transmit, to the selected one of the at least one higher-tier computing device, the first bottom-tier computing device, or the second bottom-tier computing device, the digitized content item for storage at the selected one of the at least one higher-tier computing device, the first bottom-tier computing device, or the second bottom-tier computing device.

14. The system of claim 13, wherein in an event the third user's digitized content items are viewed worldwide, the at least one higher-tier computing device is selected at a higher tier than if the third user's digitized content items are viewed in a local region.

15. The system of claim 13, wherein the selected one of the at least one higher-tier computing device, the first bottom-tier computing device, or the second bottom-tier computing device is selected contemporaneously with the receiving.

16. The system of claim 13, further comprising a component configured to transcode, at a different computing device proximate to the selected one of the at least one higher-tier computing device, the first bottom-tier computing device, or the second bottom-tier computing device, the digitized content item prior to storage of the digitized content item.

17. The system of claim 13, wherein the classification is a function of a number of friend connections the third user has in a social graph.

18. The system of claim 13, wherein the second server computing device is selected based on an evaluation of the internet protocol address of the computing device from which the digitized content item was received.

* * * * *